US012434655B1

(12) United States Patent
Faruque et al.

(10) Patent No.: US 12,434,655 B1
(45) Date of Patent: Oct. 7, 2025

(54) DOOR-MOUNTED AIRBAG ASSEMBLY

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/746,724

(22) Filed: Jun. 18, 2024

(51) Int. Cl.
| | | |
|---|---|---|
| *B60R 21/21* | (2011.01) | |
| *B60R 13/02* | (2006.01) | |
| *B60R 21/215* | (2011.01) | |
| *B60R 21/217* | (2011.01) | |
| *B60R 21/231* | (2011.01) | |
| *B60R 21/233* | (2006.01) | |

(52) U.S. Cl.
CPC ........ *B60R 21/215* (2013.01); *B60R 13/0243* (2013.01); *B60R 21/21* (2013.01); *B60R 21/217* (2013.01); *B60R 21/23138* (2013.01); *B60R 21/233* (2013.01); *B60R 2021/21537* (2013.01); *B60R 2021/23107* (2013.01); *B60R 2021/23308* (2013.01)

(58) Field of Classification Search
CPC ..... B60R 21/21; B60R 21/233; B60R 21/217; B60R 21/215; B60R 21/23138; B60R 21/231; B60R 21/2165; B60R 2021/21537; B60R 2021/23308; B60R 2021/23107; B60R 13/0243; B60R 13/0237; B60R 13/02; B60R 13/0275; B60J 5/00; B60J 5/02; B60J 5/04; B60J 5/06; B60J 5/08; B60J 5/10; B60J 5/12; B60J 5/14
USPC ............ 280/728.3, 728.2, 729, 730.1, 730.2
See application file for complete search history.

(56) References Cited

U.S. PATENT DOCUMENTS

| | | | |
|---|---|---|---|
| 5,072,966 A | 12/1991 | Nishitake et al. | |
| 5,575,497 A * | 11/1996 | Suyama | B60R 21/231 280/730.2 |
| 7,552,940 B2 | 6/2009 | Lindemann et al. | |
| 8,801,032 B2 | 8/2014 | Sadr et al. | |
| 10,525,925 B2 | 1/2020 | Deng et al. | |
| 2003/0234522 A1* | 12/2003 | Thomas | B60R 21/261 280/730.2 |
| 2004/0173999 A1* | 9/2004 | Thomas | B60R 21/215 280/728.3 |

(Continued)

FOREIGN PATENT DOCUMENTS

| | | |
|---|---|---|
| CN | 220374466 U | 1/2024 |
| KR | 101164773 B1 | 7/2012 |

*Primary Examiner* — Keith J Frisby
(74) *Attorney, Agent, or Firm* — Frank A. MacKenzie; Brooks Kushman P.C.

(57) ABSTRACT

A door for a vehicle includes a door panel. An airbag is mounted to the door panel and is inflatable to an inflated position. A trim panel includes a base segment fixed to the door panel. The trim panel includes a releasable segment positioned to be impacted by the airbag during inflation of the airbag. The releasable segment has a first end and a second end and is elongated between the first end and the second end. A hinge is between the releasable segment and the base segment. The hinge is at the first end of the releasable segment and defines an axis of rotation about which the second end of the releasable segment is rotatable.

20 Claims, 7 Drawing Sheets

(56) References Cited

U.S. PATENT DOCUMENTS

2005/0057024 A1\* 3/2005 Weston ................. B60R 21/21
                                                  280/730.2

\* cited by examiner

DOOR-MOUNTED AIRBAG ASSEMBLY

BACKGROUND

A vehicle may include one or more airbags deployable during certain vehicle impacts to control kinematics of occupants inside the vehicle. The airbag may be a component of an airbag assembly including a housing supporting the airbag, and an inflator in communication with the airbag for inflating the airbag from an uninflated position to an inflated position.

DETAILED DESCRIPTION

Figure 1:
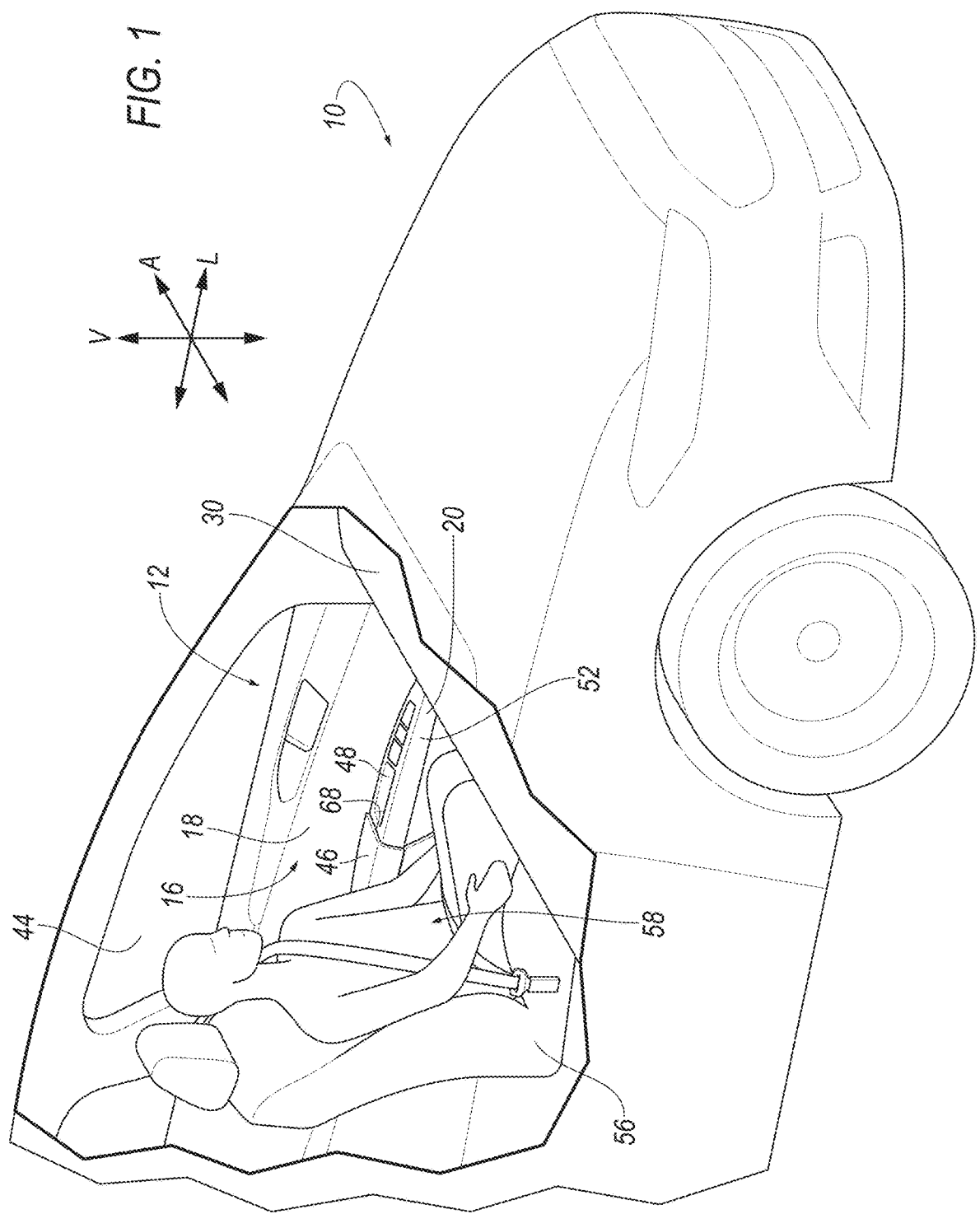
FIG. 1 is a cut-away view of a vehicle including a door with a trim panel having a releasable segment in a stowed position.
Figure 2:
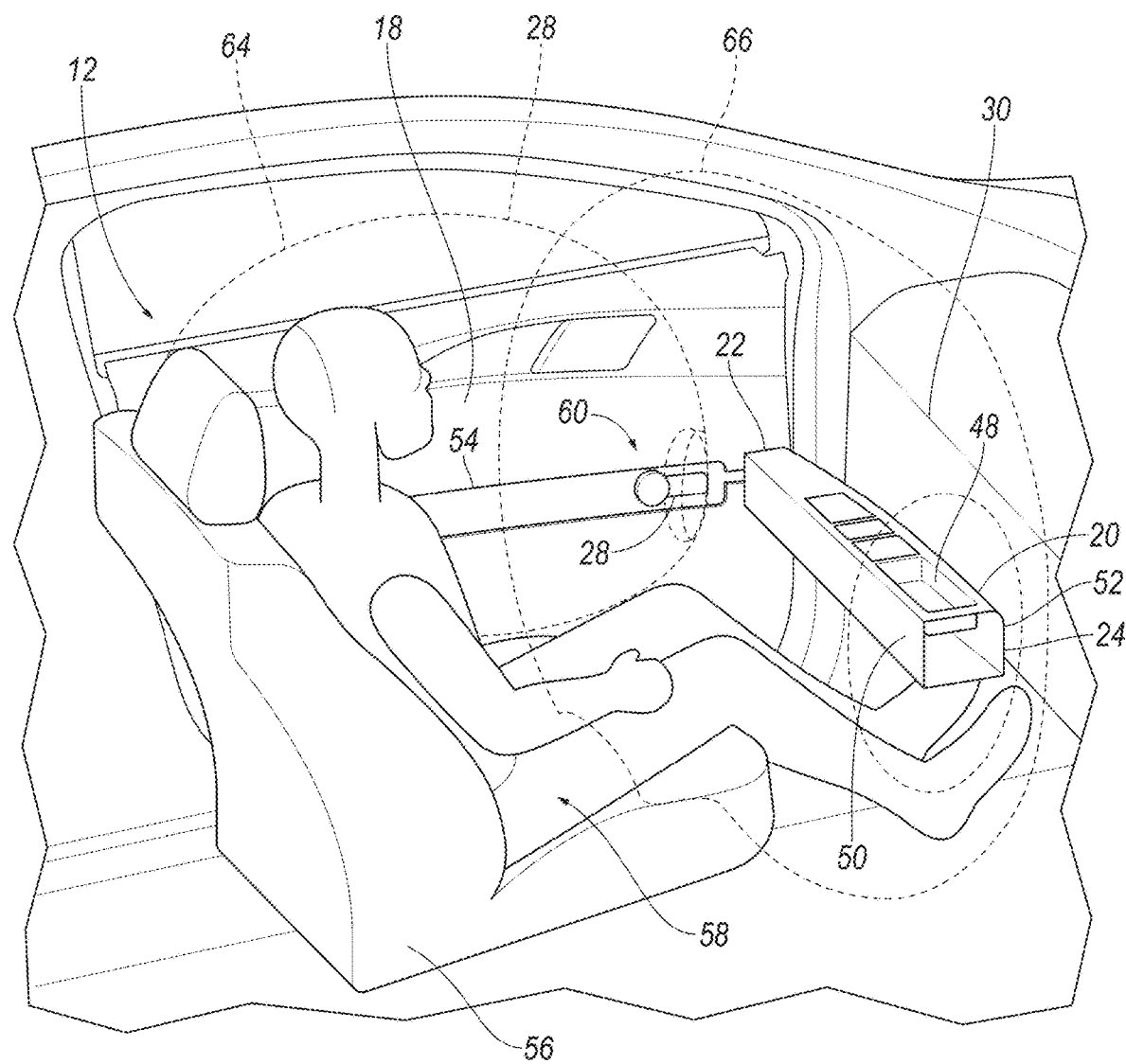
FIG. 2 is a cut-away view of the vehicle with the releasable segment in a deployed position.

A vehicle door includes a door panel and an airbag mounted to the door panel. The airbag is inflatable to an inflated position. A trim panel includes a base segment fixed to the door panel. The trim panel includes a releasable segment positioned to be impacted by the airbag during inflation of the airbag. The releasable segment has a first end and a second end and is elongated between the first end and the second end. A hinge is between the releasable segment and the base segment. The hinge is at the first end of the releasable segment and defines an axis of rotation about which the second end of the releasable segment is rotatable.

The vehicle door may include a releasable connection between the second end of the releasable segment and the base segment. The releasable connection may be designed to release the second end of the releasable segment as a result of force applied by the airbag to the releasable segment during inflation of the airbag. The releasable connection may be designed to maintain a position of the second end of the releasable segment relative to the base segment when subjected to force having a magnitude less than the force applied by the airbag to the releasable segment during inflation of the airbag.

The releasable segment may include a pull cup.

The trim panel may include an armrest adjacent to and extending vehicle-rearward from the releasable segment.

The door panel has a vehicle-forward end and a vehicle-rearward end. The releasable segment may be elongated along an axis through the vehicle-forward end and the vehicle-rearward end. The door panel may include a slot elongated along the axis, and the hinge may be slidably engaged with the slot. The second end of the releasable segment may be between the first end of the releasable segment and the vehicle-rearward end of the door panel along the axis.

The vehicle door may include an inflator mounted to the door panel and in fluid communication with the airbag.

The door panel has a vehicle-exterior surface and a vehicle-interior surface, the trim panel being disposed on the vehicle-interior surface.

A vehicle includes a dash, a vehicle door having a door panel and a trim panel, and an airbag mounted to the door panel. The airbag is inflatable to an inflated position. A trim panel includes a base segment fixed to the door panel. The trim panel includes a releasable segment positioned to be impacted by the airbag during inflation of the airbag. A hinge is rotatably connecting the releasable segment and the base segment. The releasable segment is rotatable about the hinge toward the dash.

The vehicle door has a vehicle-forward end and a vehicle-rearward end. The releasable segment may be elongated along an axis through the vehicle-forward end and the vehicle-rearward end. The door panel may include a slot elongated along the axis, and the hinge may be slidably engaged with the slot.

The releasable segment may be rotatable by the airbag about the hinge to a deployed position, and the releasable segment may abut the dash in the deployed position.

The vehicle may include a releasable connection between the releasable segment and the base segment. The releasable connection may be designed to release the releasable segment from the base segment as a result of force applied by the airbag to the releasable segment during inflation of the airbag. The releasable connection may be designed to maintain a position of the releasable segment relative to the base segment when subjected to force having a magnitude less than the force applied by the airbag to the releasable segment during inflation of the airbag.

The releasable segment may include a pull cup.

The door panel has a vehicle-exterior surface and a vehicle-interior surface, and the trim panel may be disposed on the vehicle-interior surface.

The airbag may include a front chamber elongated along the dash and a side chamber elongated along the vehicle door.

With reference to the Figures, wherein like numerals indicate like parts throughout the several views, a door 12 for a vehicle 10 includes a door panel 14. An airbag 28 is mounted to the door panel 14 and is inflatable to an inflated position. A trim panel 16 includes a base segment 18 fixed to the door panel 14. The trim panel 16 includes a releasable segment 20 positioned to be impacted by the airbag 28 during inflation of the airbag 28. The releasable segment 20 has a first end 22 and a second end 24 and is elongated between the first end 22 and the second end 24. A hinge 26 is between the releasable segment 20 and the base segment 18. The hinge 26 is at the first end 22 of the releasable segment 20 and defines an axis of rotation R about which the second end 24 of the releasable segment 20 is rotatable.

The airbag 28 is housed in the vehicle door 12, i.e., between the door panel 14 and the trim panel 16. The releasable segment 20 is in a stowed position when the airbag 28 is uninflated and the airbag 28 rotates the releasable segment 20 relative to the base segment 18 to a deployed position as the airbag 28 inflates. In some examples, the releasable segment 20 may act as a reaction surface for the airbag 28 in the inflated position. As one example, as described further below, the releasable segment 20 may abut a dash 30 of the vehicle 10 in the deployed position. In such an example, the dash 30 acts as a reaction surface for the releasable segment 20, and the releasable segment 20 acts as a reaction surface for the airbag 28. In some examples, the dash 30 may be a flat dash that lacks a steering wheel, as described further below, and as shown in the Figures.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

With reference to FIG. 1, the vehicle 10 defines a vehicle-longitudinal axis L extending between a front end (not numbered) and a rear-end (not numbered) of the vehicle 10. The vehicle 10 defines a cross-vehicle axis A extending cross-vehicle from one side to the other side of the vehicle 10. The vehicle 10 defines a vertical axis V extending through a floor and a roof of the vehicle 10. The vehicle-longitudinal axis L, the vehicle-lateral axis A, and the vertical axis V are perpendicular relative to each other.

The vehicle body may be of a unibody construction in which a vehicle 10 frame and the vehicle body are unitary (including frame rails, pillars, roof rails, etc.). As another example, the vehicle body and a vehicle frame may have a body-on-frame construction (also referred to as a cab-on-frame construction) in which the vehicle body and vehicle frame are separate components, i.e., are modular, and the body is supported on and affixed to the frame. Alternatively, the vehicle body may have any suitable construction. The vehicle body may be of any suitable material, for example, steel, aluminum, and/or fiber-reinforced plastic, etc.

The vehicle body includes body panels (not numbered). The body panels may include structural panels, e.g., rockers, pillars, roof rails, etc. The body panels may include exterior panels. The exterior panels may present a class-A surface, e.g., a finished surface exposed to view by a customer and free of unaesthetic blemishes and defects. The body panels include, e.g., a roof panel, doors 12, fenders, hood, decklid, etc. The vehicle body may define a passenger cabin 44 to house occupants of the vehicle 10.

The doors 12 of the vehicle 10 are openable for occupants to enter and exit a passenger cabin 44. The roof may contact a top edge of the doors 12 when the doors 12 are closed. The door 12 has a vehicle-forward end and a vehicle-rearward end. The door 12 may be hinged to the rest of the vehicle body at the vehicle-forward end for rotation between an open position and a closed position. In the example shown in the Figures, the front left door 12 includes the airbag 28 and trim panel 16 described herein. Any one, more than one, or all of the doors 12 of the vehicle may include the airbag 28 and the trim panel 16.

Figure 3:
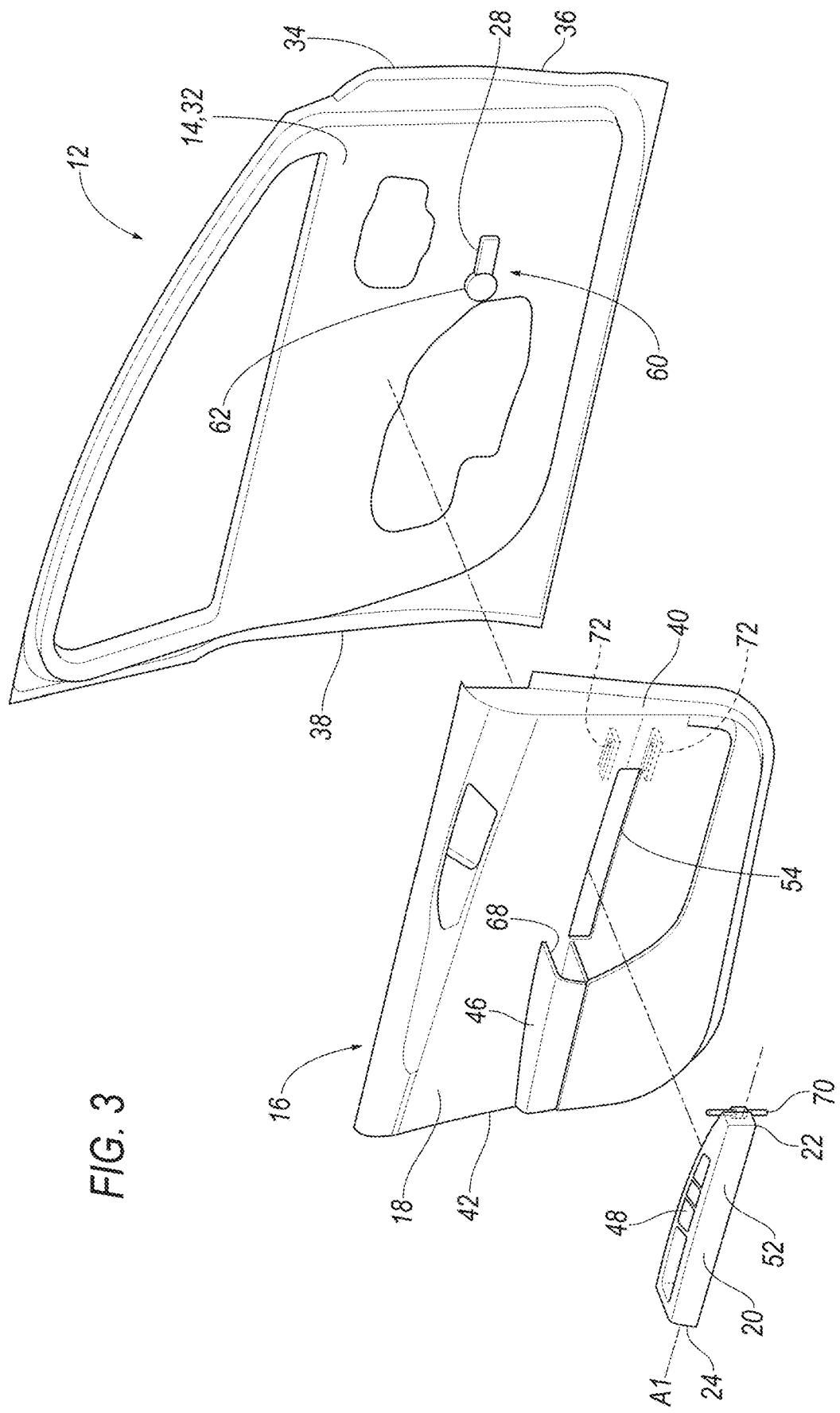
FIG. 3 is an exploded view of the door.

With reference to FIG. 3, the door 12 includes at least one door panel 14, and the trim panel 16 is supported on the door panel 14. Specifically, the door 12 may include two panels, namely a door inner 32 and a door outer 34. In such an example, the trim panel 16 and the door outer 34 are fixed to the door inner 32. The trim panel 16 is positioned opposite the door outer 34 relative to the door inner 32. The door inner 32 has a vehicle-exterior surface and a vehicle-interior surface, and the trim panel 16 is disposed on the vehicle-interior surface. The trim panel 16 is inboard relative to the door inner 32, and the door outer 34 is outboard relative to the door inner 32. The door 12 includes a window opening that may be completely closed by a window when the window is in a fully raised position. The window opening is defined by the trim panel 16 and door outer 34 on a bottom edge and either by the door inner 32 circumscribing the window opening or by the vehicle body, e.g., the pillars, and the roof. The door outer 34 faces outboard relative to the vehicle 10. The door panel 14, e.g., the door inner 32, has a vehicle-forward end 36 and a vehicle-rearward end 38. The trim panel 16 has a vehicle-forward end 40 and a vehicle-rearward end 42.

The door outer 34 may define a portion of the exterior of the vehicle 10. For example, the door outer 34 may present a class-A surface, i.e., a surface specifically manufactured to have a high-quality, finished aesthetic appearance free of blemishes. The door outer 34 may be metal (such as steel, aluminum, etc.) or polymeric (such as fiber reinforced plastic composite, etc.).

The door inner 32 may be metal (such as steel, aluminum, etc.) or polymeric (such as fiber reinforced plastic composite, etc.). The door inner 32 provides structural rigidity for the door outer 34. The door inner 32 may provide a mounting location for components of the door 12.

As set forth above, the trim panel 16 includes the base segment 18 and the releasable segment 20. The base segment 18 is fixed to the door panel 14, e.g., the door inner 32, and the releasable segment 20 is rotatable relative to the base segment 18 upon inflation of the airbag 28. The base segment 18 may be fixed to the door inner 32 with any suitable type of fasteners, such as Christmas-tree fasteners.

The base segment 18 of the trim panel 16 may include a core and a covering. The core may be, for example, plastic, and may be rigid relative to the covering. The covering may include upholstery, padding, etc. The upholstery may be cloth, leather, faux leather, or any other suitable material. The covering is exposed to the passenger cabin 44 and may have a class-A surface, i.e., a surface specifically manufactured to have a high quality, finished aesthetic appearance free from blemishes.

With reference to FIGS. 3-5C, the base segment 18 includes an armrest 46. The armrest 46 is adjacent to the releasable segment 20. Specifically, the armrest 46 may abut the releasable segment 20 when the releasable segment 20 is in the stowed position. The armrest 46 extends vehicle-rearward from the releasable segment 20 when the door 12 is in the closed position, i.e., the armrest 46 extends along the vehicle-longitudinal direction when the door 12 is in the closed position. The armrest 46 may be used by a vehicle occupant in the seat 56 adjacent the trim panel 16 during operation of the vehicle 10, and the armrest 46 may have sufficient strength to support the weight of an arm of the occupant and any other forces exerted by the occupant on the armrest 46. The armrest 46 may be unitary with the rest of the trim panel 16, i.e., formed together simultaneously as a single continuous unit. The releasable segment 20 moves relative to the armrest 46 when the releasable segment 20 moves from the stowed position to the deployed position.

The releasable segment 20 is supported by the base segment 18. In other words, the weight of the releasable segment 20 is borne by the base segment 18. As described further below, the releasable segment 20 is rotatable from the stowed position to the deployed position when the airbag 28 inflates. The releasable segment 20 is supported by the base segment 18 in both the stowed position and the deployed position.

The releasable segment 20 includes a pull cup 48. The pull cup 48 is a recess that can be gripped by an occupant to pull the door 12 closed and to push the door 12 open. The pull cup 48 is designed, i.e., sized, shaped, and positioned, to receive the fingers of the occupant. The pull cup 48 may extend downwardly. The releasable segment 20 may include electronic components, such as window control buttons and door lock buttons, as shown in the example in the Figures.

The releasable segment 20 has a first end 22 and a second end 24. The releasable segment 20 is elongated between the first end 22 and the second end 24. The releasable segment 20 is elongated along an axis A1 through the vehicle-forward end 36 and the vehicle-rearward end 38 of the door 12. The second end 24 of the releasable segment 20 is between the first end 22 of the releasable segment 20 and the vehicle-rearward end 40 of the trim panel 16 along the axis A1. The axis A1 may be parallel to the vehicle-longitudinal axis L.

The releasable segment 20 includes a back side 50 and a front side 52. The back side 50 is spaced from the front side 52. The back side 50 faces the door inner 32 and the door outer 34 in the stowed position, and the front side 52 faces the passenger cabin 44 in the stowed position. The back side 50 is positioned to be impacted by the airbag 28 when the airbag 28 inflates to the inflated position. In the deployed position, the back side 50 may be a reaction surface for the airbag 28. In such an example, the airbag 28 abuts the back side 50 in the inflated position and the back side 50 positions the airbag 28 in the inflated position. In some examples, the releasable segment 20 abuts the dash 30 in the deployed position. In such examples, the front side 52 of the releasable segment 20 abuts the dash 30 and the back side 50 of the releasable segment 20 is spaced vehicle-rearward of the front side 52.

The releasable segment 20 is rigid relative to the airbag 28. The releasable segment 20 maintains structural shape and rigidity when impacted by the airbag 28 and when the releasable segment 20 is in the deployed position. In the example in which the releasable segment 20 abuts the dash 30 in the deployed position, the releasable segment 20 is rigid relative to the airbag 28 in the deployed position so that the back side 50 acts as a reaction surface for the airbag 28 in the inflated position. The releasable segment 20, for example, may be plastic. The releasable segment 20 may include a class-A surface exposed to the passenger cabin 44, i.e., a surface specifically manufactured to have a high quality, finished aesthetic appearance free from blemishes. Specifically, the front side 52 of the releasable segment 20 may have a class-A surface exposed to the passenger cabin 44.

The base segment 18 of the trim panel 16 may define one or more holes 54 through which other components may extend. For example, the trim panel 16 may include a hole 54 aligned with the releasable segment 20 and the airbag 28. The releasable segment 20 covers the hole 54 to separate the hole 54 from the passenger cabin 44. The back side 50 of the releasable segment 20 is positioned to be impacted by the airbag 28 when the airbag 28 inflates through the slot to the inflated position. The airbag 28 extends through the hole 54 and impacts the back side 50 of the releasable segment 20 to rotate the releasable segment 20 relative to the base segment 18 during inflation of the airbag 28 to the inflated position.

The vehicle 10 includes at least one dash 30. In the example shown in the Figures, the dash 30 is at the front end of the passenger cabin 44. The dash 30 may also be called a bulkhead or an instrument panel.

The dash 30 may include vehicle controls, such as gauges, dials, screens, and information displays; heating and ventilation equipment; a radio and other electronics; etc. The dash 30 may, for example, include a class-A surface, i.e., a surface specifically manufactured to have a high quality, finished aesthetic appearance free from blemishes. The dash 30, as well as the rest of the vehicle 10, may lack a steering wheel and may lack pedals for accelerating and braking. In other words, as shown in the Figures, no steering wheel or pedals for accelerating and braking are supported by or adjacent to the dash 30. More specifically, the vehicle 10 does not include a steering wheel or pedals for accelerating and braking, e.g., the vehicle 10 is autonomous. The dash 30 may, for example, be flat in the cross-vehicle direction, as shown in Figures. In other words, a front face of the dash 30 may be generally planar.

The dash 30 may extend from one side of the vehicle 10 to the other side of the vehicle 10, i.e., across the passenger cabin 44 in a cross-vehicle direction. For example, the dash 30 may extend from one body pillar to another body pillar. The dash 30 may extend downwardly from a windshield. For example, the dash 30 may extend from the windshield to the floor of the vehicle 10.

The dash 30 may be a structural member of a frame of the vehicle 10, i.e., a portion of the frame resists static and dynamic forces from operation of the vehicle 10 without undue deflection or distortion. Examples of forces include a weight of other vehicle 10 components, passengers, and cargo; twisting forces caused by driving over uneven surfaces; torque from a transmission; longitudinal and lateral forces from driving; and possibly forces from impacts with other vehicles or impactors.

The vehicle 10 includes one or more seats 56. The vehicle 10 may include any suitable number of seats 56. The seats 56 may be arranged in the passenger cabin 44 in any suitable position, i.e., as front seats, rear seats, third-row seats, etc. In the example shown in the Figures, the vehicle 10 includes a front row of seats and a rear row of seats. The seat 56 may be movable relative to the floor to various positions, e.g., movable fore-and-aft and/or cross-vehicle. The seats 56 may be of any suitable type, e.g., a bucket seat.

The seat 56 includes a seatback and a seat bottom. The seatback may be supported by the seat bottom and may be stationary or movable relative to the seat bottom. The seatback and the seat bottom may be adjustable in multiple degrees of freedom. Specifically, the seatback and the seat bottom may themselves be adjustable, in other words, adjustable components within the seatback and/or the seat bottom, and/or may be adjustable relative to each other. The seatback may define an occupant-seating area 58. The occupant-seating area 58 is the space occupied by an occupant properly seated on the seat 56.

An airbag assembly 60 includes the airbag 28 and an inflator 62. The inflator 62 inflates the airbag 28 to the inflated position. The airbag 28 of the airbag assembly 60 is inflatable from the uninflated position to the inflated position. The airbag assembly 60 is supported by the vehicle body in the uninflated position and in the inflated position. In other words, the weight of the airbag assembly 60 is borne by the vehicle body in the uninflated position and the inflated position. Specifically, the weight of the airbag 28 is borne by the vehicle body in the uninflated position and the inflated position. In the example shown in the Figures, the airbag 28 and the inflator 62 are supported by the door 12, specifically the outer panel of the door 12, in the uninflated position and the inflated position.

The airbag 28 and the inflator 62 may be supported by the vehicle body, e.g., the crossbeam of the roof, by direct attachment or indirect attachment. In the example shown in the Figures, the airbag 28 and the inflator 62 are directly attached to the door 12 in the inflated position and in the uninflated position. In such examples, clips, threaded fasteners, straps, etc., may directly attach the airbag 28 and/or inflator 62 to the door 12. In other examples, the airbag assembly 60 may include a housing that houses and supports the airbag 28 in the uninflated position and supports the airbag 28 in the inflated position. In such examples, the airbag 28 may be attached to the housing and rolled and/or folded to fit within the housing in the uninflated position. The housing may be of any suitable material, e.g., a rigid polymer, a metal, a composite, or a combination of rigid materials. The airbag 28 housing may, for example, include clips, threaded fasteners, etc., for attaching the housing to the door 12. In examples including the housing, the inflator 62 may be attached to the housing and may be housed in the housing.

The inflator 62 is in fluid communication with the airbag 28 to inflate the airbag 28 to the inflated position. The inflator 62 supplies inflation medium to the airbag 28. Specifically, the inflator 62 supplies inflation medium to an inflation chamber of the airbag 28. In some examples, the inflator 62 may be at least partially in the airbag 28 to deliver inflation medium directly to the airbag 28. As another example, the inflator 62 may be fluidly connected to the airbag 28 through fill tubes, diffusers, etc. The inflator 62 may be, for example, a pyrotechnic inflator that ignites a chemical reaction to generate the inflation medium, a stored gas inflator that releases (e.g., by a pyrotechnic valve) stored gas as the inflation medium, or a hybrid.

The airbag 28 may include one or more panels. The airbag 28, e.g., the panel(s), may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

The airbag 28 includes a side segment 64 and a front segment 66. In the inflated position, the side segment 64 extends from the hole 54 vehicle rearwardly along the trim panel 16. The side segment 64 is between the occupant-seating area 58 and the trim panel 16 in the inflated position. The front segment 66 extends from the hole 54 cross-vehicle along the dash 30 in the inflated position. The front segment 66 is between the occupant-seating area 58 and the dash 30 in the inflated position.

An inflation chamber of the side segment 64 may be in fluid communication with an inflation chamber of the front segment 66 in some examples. In such examples, the inflator 62 may inflate both the side segment 64 and the front segment 66 together with one supply of inflation medium. In other examples, the inflation chamber of the side segment 64 may be separated from the inflation chamber of the front segment 66. In such examples, the fabric of the side segment 64 and the front segment 66 may be separate and disconnected from each other, i.e., separate airbags, or the fabric of the side segment 64 and the front segment 66 may be connected to each other so that the side airbag 28 and the front airbag 28 form a single airbag 28 with multiple inflation chambers.

As set forth below, the airbag 28 rotates the releasable segment 20 to the deployed position as the airbag 28 inflates to the inflated position. The releasable segment 20 is positioned to be impacted by the airbag 28 during inflation of the airbag 28. In the example shown in the Figures, the airbag 28 is positioned to extend through the hole 54 in the trim panel 16 toward the passenger cabin 44. The releasable segment 20 covers the hole 54 such that, when the airbag 28 extends through the hole 54, the airbag 28 impacts the releasable segment 20.

A releasable connection 68 is between the releasable segment 20 and the base segment 18. Specifically, the releasable connection 68 is between the second end 24 of the releasable segment 20 and the base segment 18. The releasable connection 68 may include, for example, adhesive, bonding, a spot weld, a threaded fastener, brackets, etc., that connect the releasable segment 20 to the base segment 18 in a releasable fashion when subjected to force from the inflation of the airbag 28.

The releasable connection 68 maintains the connection between the second end 24 of the releasable segment 20 and the base segment 18 when the pull cup 48 is pushed or pulled by an occupant to open or close the door 12. Force exerted by the occupant on the pull cup 48 is transmitted to the base segment 18 through the releasable connection 68. The releasable connection 68 releases the second end 24 of the releasable segment 20 from the base segment 18 when the airbag 28 inflates through the hole 54 in the base segment 18. The releasable connection 68 is designed to maintain a position of the second end 24 of the releasable segment 20 relative to the base segment 18 when subjected to force having a magnitude less than the force applied by the airbag 28 to the releasable segment 20 during inflation of the airbag 28, and the releasable connection 68 is designed to release the second end 24 from the releasable segment 20 as a result of force applied by the airbag 28 to the releasable segment 20 during inflation of the airbag 28. The integrity of the releasable connection 68 is maintained, i.e., the releasable connection 68 does not release, when subjected to forces below the magnitude of force on the releasable segment 20 from the inflation of the airbag 28, and the releasable connection 68 releases, e.g., fractures, tears, etc., when subjected to forces on the back side 50 of the releasable segment 20 from inflation of the airbag 28.

The hinge 26 rotatably connects the releasable segment 20 and the base segment 18. When the releasable connection 68 releases in response to impact by the airbag 28, the releasable segment 20 rotates relative to the base segment 18 about the hinge 26. In the example shown in the Figures, the releasable segment 20 is rotatable about the hinge 26 toward the dash 30.

The hinge 26 may be of any suitable type that allows the releasable segment 20 to rotate relative to the base segment 18. In the example shown in the Figures, the hinge 26 includes a pin 70 fixed to the releasable segment 20 and rotatable relative to the base segment 18, e.g., through two slots 72 as described further below. The hinge 26 is at the first end 22 of the releasable segment 20 and defines an axis of rotation R about which the second end 24 of the releasable segment 20 is rotatable. In the example shown in the Figures, the pin 70 is elongated generally vertically and is rotatable relative to the base segment 18 about a generally vertical axis. The pin 70 may be elongated parallel to the vertical axis V of the vehicle 10.

The trim panel 16 includes a slot 72 and the hinge 26, e.g., the pin 70, is slidably engaged with the slot 72. In the example shown in the Figures, the trim panel 16 includes two slots 72 spaced from each other and the pin 70 is slidably engaged with both slots 72. The slot 72 is elongated, i.e., one dimension is longer than the others. In the example shown in the Figures, the releasable segment 20 is elongated along the axis A1 through the vehicle-forward end 40 and the vehicle-rearward end 42, and the slot 72 is elongated along the axis A1. The axis A2 of the slot 72 may be parallel to the vehicle-longitudinal axis L. The slot 72 and the releasable segment 20 may be elongated along axes that are parallel with each other in the stowed position, as shown in the example in the Figures.

Figure 4:
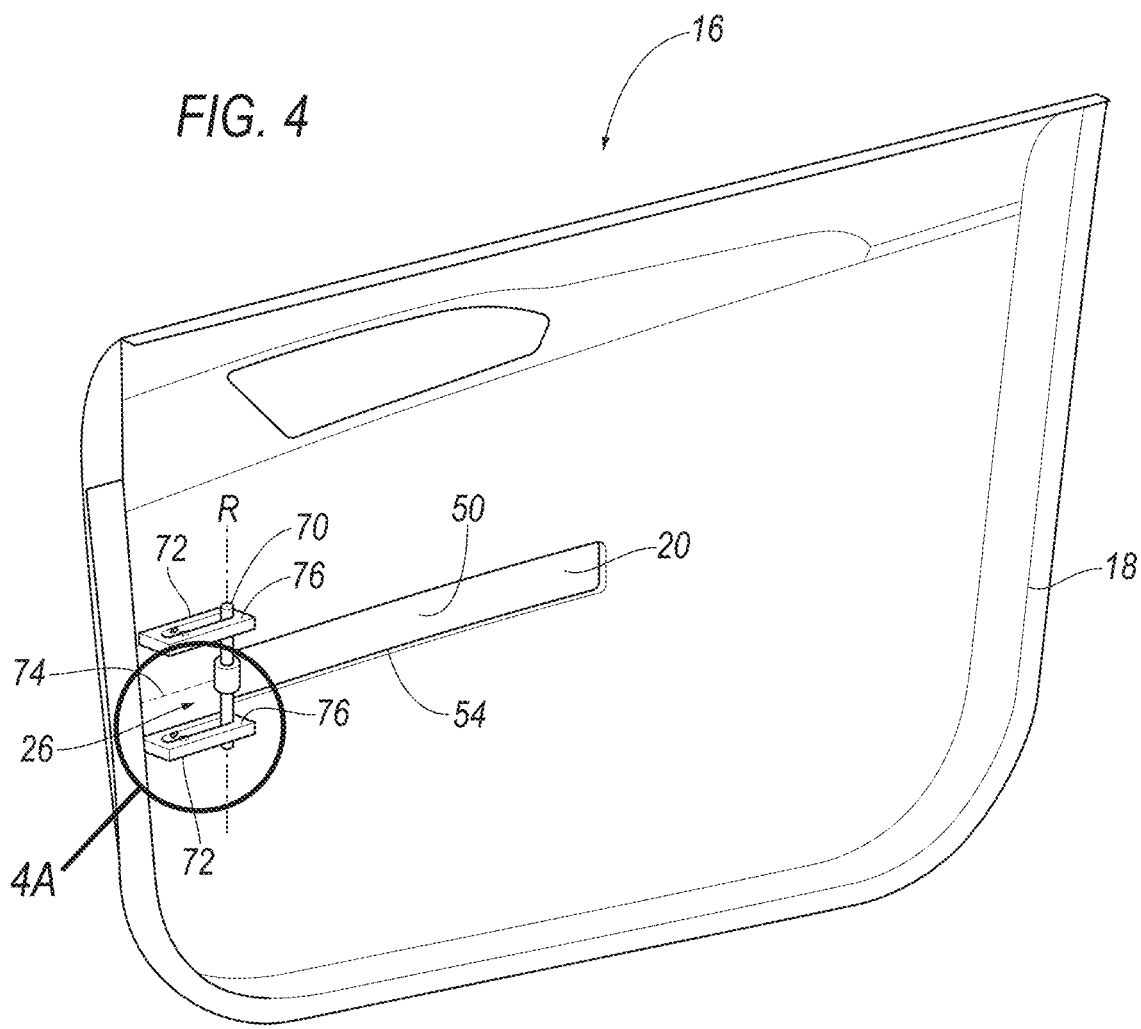
FIG. 4 is a perspective view of a back side of the trim panel.
Figure 4A:
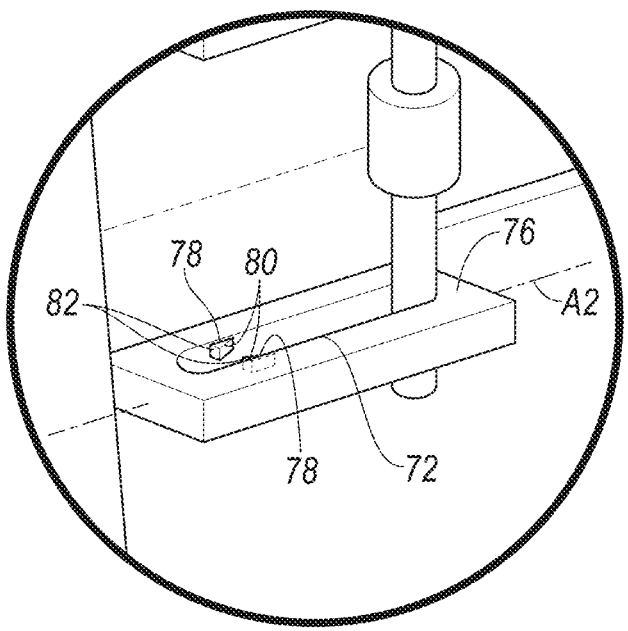
FIG. 4A is a magnified view of a portion of FIG. 4.

The slots 72 may be defined in ledges 76 of the base segment 18, as shown in the example in FIGS. 3-5C. In the example shown in the Figures, the trim panel 16 includes two ledges 76 spaced vertically from each other. In other examples, the trim panel 16 may include one ledge 76. One or more of the ledges 76 may include a lock 78 that locks the pin 70 along the slot 72 in the deployed position. In some examples, the lock 78 is moveable to allow the pin 70 to slide along the slot 72 to the deployed position and resiliently returns into the slot 72 to prevent the pin 70 from sliding toward the stowed position. The lock 78, in some examples, may be spring-loaded. In such examples, a spring is between the lock 78 and the ledge 76, and the spring is compressible to allow the lock 78 to recess into the ledge 76 and out of the slot 72 to allow the pin 70 to slide from the stowed position to the deployed position. After the pin 70 passes the lock 78 and reaches the deployed position, the spring returns the lock 78 into the slot 72 to prevent return of the pin 70. In such examples, the lock 78 may have a ramp 80 and a stopping surface 82, as shown in FIG. 4A. The ramp 80 faces the pin 70 in the stowed position, and the stopping surface 82 faces the pin 70 in the deployed position. The ramp 80 is shaped in the slot 72 so that the pin 70 slides over the lock 78 during movement from the stowed position to the deployed position. The stopping surface 82 is shaped in the slot 72 to prevent movement of the pin 70 from the deployed position toward the stowed position. In other examples, the lock 78 may be electronically activated. For example, the lock 78 may be a solenoid.

The base segment 18 may include a tear seam 74 that separates to allow the releasable segment 20 to move along the slots 72. The tear seam 74 is designed to rupture upon movement of the hinge 26, e.g., the pin 70, in the slot 72 during inflation of the airbag 28. The tear seam 74 may be weaker than a portion of the base segment 18 adjacent the tear seam 74, e.g., the tear seam 74 may be thinner, a weaker material, etc. The tear seam 74 may connect panels of the base segment 18, e.g., with breakaway stitches. The tear seam 74 may be elongated along the vehicle-longitudinal axis L.

Figure 5A:
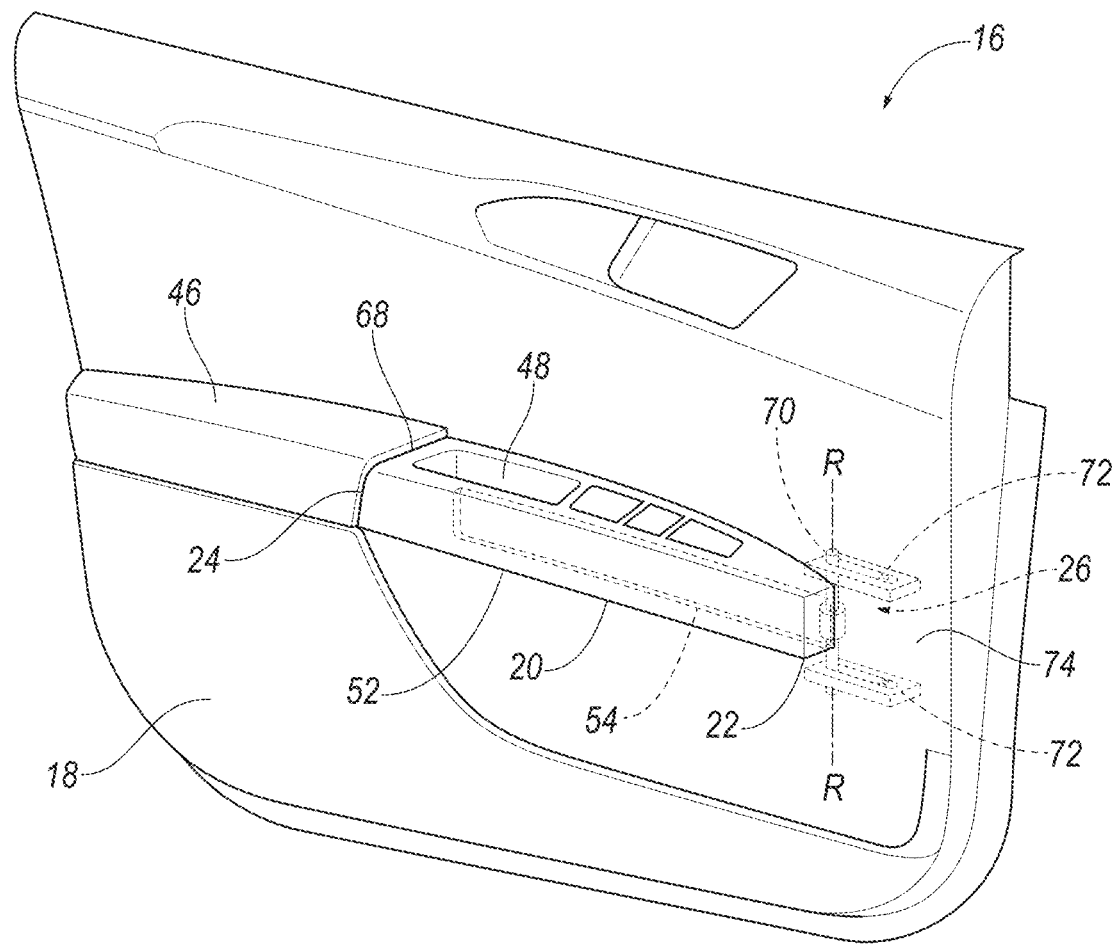
FIG. 5A is a perspective view of a front side of the trim panel with the releasable segment in the stowed position.
Figure 5B:
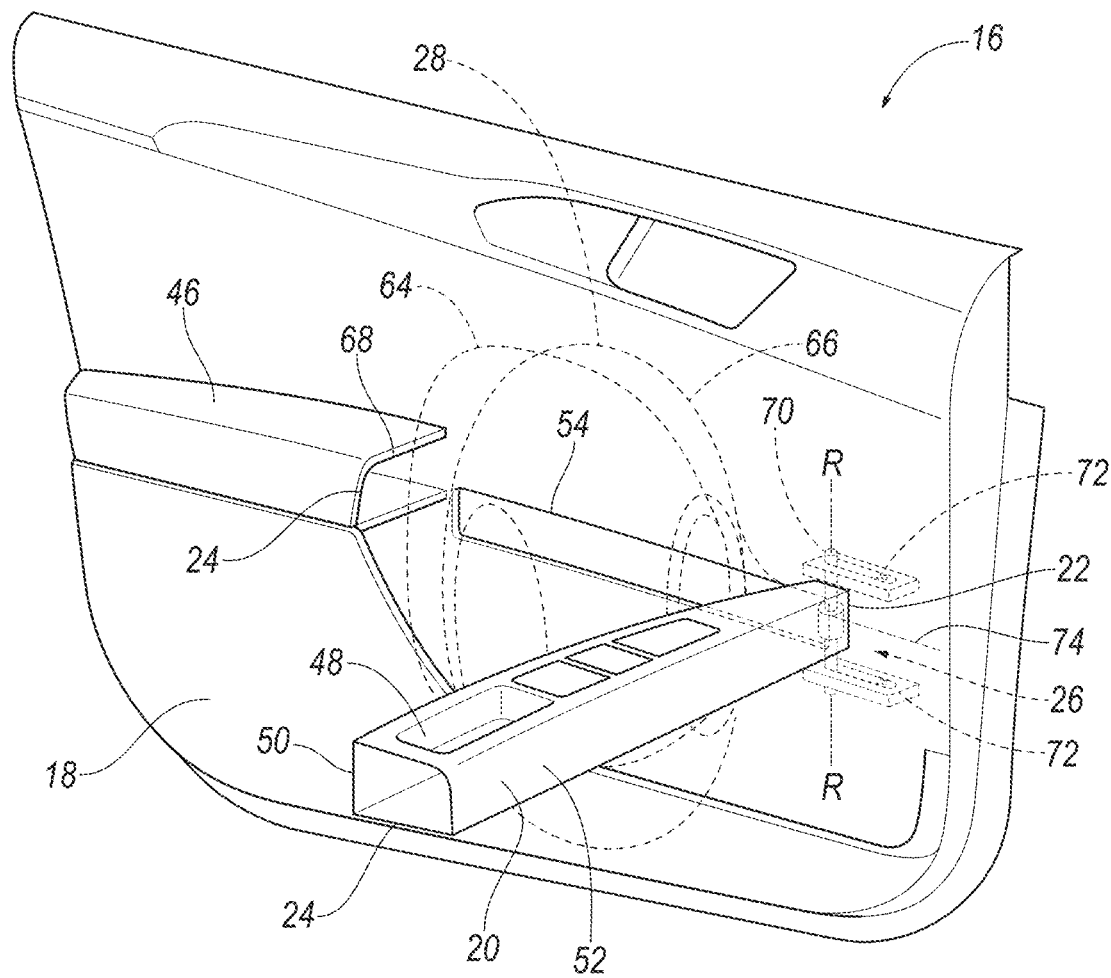
FIG. 5B is the perspective view of FIG. 5A with the releasable segment rotated by an airbag moving from an uninflated position to an inflated position.
Figure 5C:
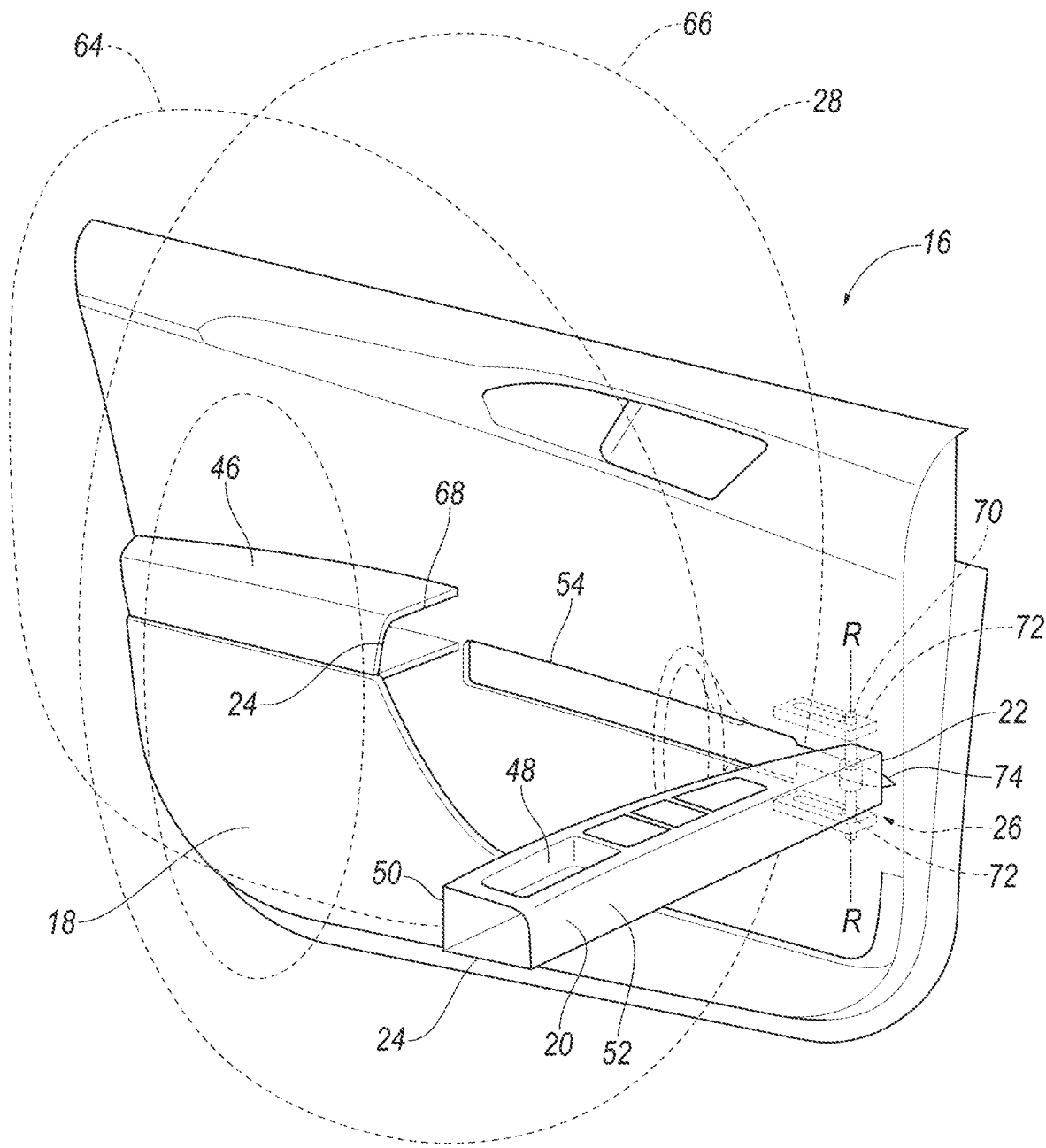
FIG. 5C is the perspective view of FIG. 5A with the releasable segment in the deployed position.

The airbag 28 inflates through the hole 54 in the base segment 18 and impacts the back side 50 of the releasable segment 20 to rotate. This force releases the releasable connection 68 and the force of the airbag 28 rotates the releasable segment 20 relative to the base segment 18 about the hinge 26, as shown in FIG. 5B. The releasable segment 20 rotates toward the dash 30. The force of the airbag 28 also slides the hinge 26, e.g., the pin 70, along the slot 72 (e.g., both slots 72 in the example shown in the Figures) in the vehicle-forward direction. As the pin 70 moves along the slots 72, the releasable segment 20 breaks the tear seam 74 and the releasable segment 20 moves vehicle-forward to the dash 30 to the deployed position, as shown in FIG. 5C. The front side 52 of the releasable segment 20 abuts the dash 30 in the deployed position.

The vehicle 10 includes a computer that controls the activation of the inflator 62. The computer may be, for example, a restraints control module. The computer includes a processor and a memory. The memory includes one or more forms of computer readable media, and stores instructions executable by the processor for performing various operations, including as disclosed herein. For example, the computer can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer. The memory can be of any type, e.g., hard disk drives, solid state drives, servers, or any volatile or non-volatile media. The memory can store the collected data sent from the sensors. The memory can be a separate device from the rest of the computer, and the computer can retrieve information stored by the memory via a network in the vehicle 10, e.g., over a CAN bus, a wireless network, etc.

The vehicle 10 may include at least one impact sensor for sensing certain vehicle 10 impacts (e.g., impacts of a certain magnitude, direction, etc.), and the computer is in communication with the impact sensor and the inflator 62. The computer may activate the inflator 62, e.g., provide an impulse to a pyrotechnic charge of the inflator 62 when the impact sensor senses certain vehicle impacts. The impact sensor may be configured to sense certain vehicle impacts prior to impact, i.e., pre-impact sensing. The impact sensor may be in communication with the computer. The impact sensor is configured to detect certain vehicle impacts. In other words, a "certain vehicle impact" is an impact of the type and/or magnitude for which inflation of the airbag 28 is designed i.e., "certain" indicates the type and/or magnitude of the impact. The type and/or magnitude of such "certain vehicle impacts" may be pre-stored in the computer, e.g., a restraints control module. The impact sensor may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle door comprising:
   a door panel;
   an airbag mounted to the door panel and being inflatable to an inflated position;
   a trim panel including a base segment fixed to the door panel;
   the trim panel including a releasable segment positioned to be impacted by the airbag during inflation of the airbag;

the releasable segment having a first end and a second end and being elongated between the first end and the second end; and a hinge between the releasable segment and the base segment, the hinge being at the first end of the releasable segment and defining an axis of rotation about which the second end of the releasable segment is rotatable;

the door panel having a vehicle-forward end and a vehicle-rearward end, the releasable segment being elongated along an axis through the vehicle-forward end and the vehicle-rearward end;

the door panel including a slot elongated along the axis, the hinge being slidably engaged with the slot.

2. The vehicle door as set forth in claim 1, further comprising a releasable connection between the second end of the releasable segment and the base segment.

3. The vehicle door as set forth in claim 2, wherein the releasable connection is designed to release the second end from the base segment as a result of force applied by the airbag to the releasable segment during inflation of the airbag.

4. The vehicle door as set forth in claim 3, wherein the releasable connection is designed to maintain a position of the second end of the releasable segment relative to the base segment when subjected to force having a magnitude less than the force applied by the airbag to the releasable segment during inflation of the airbag.

5. The vehicle door as set forth in claim 1, wherein the releasable segment includes a pull cup.

6. The vehicle door as set forth in claim 5, wherein the trim panel includes an armrest adjacent to and extending vehicle-rearward from the releasable segment.

7. The vehicle door as set forth in claim 1, wherein the trim panel includes an armrest adjacent to and extending vehicle-rearward from the releasable segment.

8. The vehicle door as set forth in claim 1, wherein the second end of the releasable segment is between the first end of the releasable segment and the vehicle-rearward end of the door panel along the axis.

9. The vehicle door as set forth in claim 1, further comprising an inflator mounted to the door panel and in fluid communication with the airbag.

10. The vehicle door as set forth in claim 1, wherein the door panel has a vehicle-exterior surface and a vehicle-interior surface, the trim panel being disposed on the vehicle-interior surface.

11. A vehicle comprising:
a dash;
a vehicle door having a door panel and a trim panel;
an airbag mounted to the door panel and being inflatable to an inflated position;
the trim panel including a base segment fixed to the door panel;
the trim panel including a releasable segment positioned to be impacted by the airbag during inflation of the airbag; and a hinge rotatably connecting the releasable segment and the base segment, the releasable segment being rotatable about the hinge toward the dash;

the releasable segment being rotatable by the airbag about the hinge to a deployed position, the releasable segment abutting the dash in the deployed position.

12. The vehicle as set forth in claim 11, wherein the vehicle door has a vehicle-forward end and a vehicle-rearward end, the releasable segment being elongated along an axis through the vehicle-forward end and the vehicle-rearward end.

13. The vehicle as set forth in claim 12, wherein the door panel includes a slot elongated along the axis, the hinge being slidably engaged with the slot.

14. The vehicle as set forth in claim 11, further comprising a releasable connection between the releasable segment and the base segment.

15. The vehicle as set forth in claim 14, wherein:
the releasable connection is designed to release the releasable segment from the base segment as a result of force applied by the airbag to the releasable segment during inflation of the airbag; and
the releasable connection is designed to maintain a position of the releasable segment relative to the base segment when subjected to force having a magnitude less than the force applied by the airbag to the releasable segment during inflation of the airbag.

16. The vehicle as set forth in claim 11, wherein the releasable segment includes a pull cup.

17. The vehicle as set forth in claim 11, wherein the door panel has a vehicle-exterior surface and a vehicle-interior surface, the trim panel being disposed on the vehicle-interior surface.

18. The vehicle as set forth in claim 11, wherein the airbag includes a front chamber elongated along the dash and a side chamber elongated along the vehicle door.

19. A vehicle door comprising:
a door panel;
an airbag mounted to the door panel and being inflatable to an inflated position;
a trim panel including a base segment fixed to the door panel;
the trim panel including a releasable segment positioned to be impacted by the airbag during inflation of the airbag;
the releasable segment having a first end and a second end and being elongated between the first end and the second end, the releasable segment includes a pull cup; and
a hinge between the releasable segment and the base segment, the hinge being at the first end of the releasable segment and defining an axis of rotation about which the second end of the releasable segment is rotatable.

20. The vehicle door as set forth in claim 19, wherein the trim panel includes an armrest adjacent to and extending vehicle-rearward from the releasable segment.

* * * * *